RELAY SWITCHING CIRCUIT

Filed Nov. 10, 1958

INVENTOR.
KARL HINRICHS

BY HIS ATTORNEYS.
HARRIS, KIECH, FOSTER & HARRIS

United States Patent Office 2,963,595

Patented Dec. 6, 1960

2,963,595

RELAY SWITCHING CIRCUIT

Karl Hinrichs, Anaheim, Calif., assignor to Beckman Instruments, Inc., a corporation of California Filed Nov. 10, 1958, Ser. No. 772,812

6 Claims. (Cl. 307—112)

This invention relates to switching circuits for analog signals such as may be encountered in analog computers and data processing equipment. The invention is particularly intended for use in the switching of small voltages and currents in high impedance circuitry with high accuracy.

In many systems handling analog voltages, signals from different sources and at different impedance levels may be switched singly, sequentially or in various combinations to provide the desired resultant. The components of the circuitry may be periodically switched in and out of the system to enable the equipment to perform different functions operating in different modes.

Analog circuits are now being used to handle very low votlages with accuracies in the order of one part in ten thousand. The accuracy of an analog signal is best preserved by use of relays as switching devices for the signal paths. Relays provide low contact resistance, isolation of contact circuitry from switch drive circuitry, low cost and high reliability. However, relays do introduce some noise into the signal circuitry, the drive and noise voltages on the coil of the relay being coupled to the contacts through the coil-contact capacitance and leakage resistance. This problem is particularly severe with mercury contact relays, the physical form of the relay making adequate coil-contact shielding difficult and expensive. Yet mercury contact relays are extensively used and are preferred for low level analog voltage switching because of their long life, low cost and superior contact characteristics.

Accordingly, it is an object of the invention to provide a relay switching circuit which will substantially eliminate the noise fed into the contact circuitry by the relay coil drive voltages. A further object of the invention is to provide such a circuit which achieves the aforesaid object without exposing the drive circuitry to coil discharge voltage transients.

It is an object of the invention to provide such a relay switching circuit which does not require relay energizing switches which must have both terminals remote from ground potential. A further object is to provide such a circuit which does not require the use of coil-discharge capacitors, diodes, transistor switches, or other additional components or any increase in the cost of manufacture.

It is an object of the invention to provide a relay switching circuit in which the realy coil drive circuitry can be connected to minimize spurious induced voltages and to minimize induced current in the loop formed by the relay coil drive, the coil-contact intercapacitance and leakage resistance of the relay, the analog signal circuitry and system ground.

It is a further object of the invention to provide one or more relays for switching a circuit between a high impedance condition and a low impedance condition wherein the coil of the relay is energized for the low impedance condition of the associated circuitry and is unenergized and shunted to circuit ground for the high impedance condition. Another object of the invention is to provide a circuit for connecting one or more signals to an amplifier input with each signal source and associated relay contact set connected in parallel with the other sources, and with the relay coils for the unconnected signals grounded and the relay coil or coils for the connected signals energized.

It is an object of the invention to provide a circuit for switching an amplifier from an operational feedback mode to a potentiometric feedback mode and return wherein all relay coils are energized when in the low impedance operational mode and all coils are shunted to ground when in the high impedance potentiometric mode.

The invention contemplates connecting a direct current power source or battery in series with a resistance and a relay coil, with the junction of the coil and power source returned to circuit ground and with an off-on switch connected across the relay coil, the relay being actuated by closing and opening the switch. The invention further contemplates connecting the contact sets of one or more such relays such that the circuit being switched is connected to a low impedance path to circuit ground or to a low impedance voltage source when the relay coil is energized, while permitting the circuit to be connected to a high impedance path or source, including an open circuit, with both ends of the relay coil grounded.

The invention also comprises novel details of circuitry and novel combinations and arrangements of components, which will more fully appear in the course of the following description. The drawing merely shows and the description merely describes preferred embodiments of the present invention which are given by way of illustration or example.

Figures 1, 2, 3:
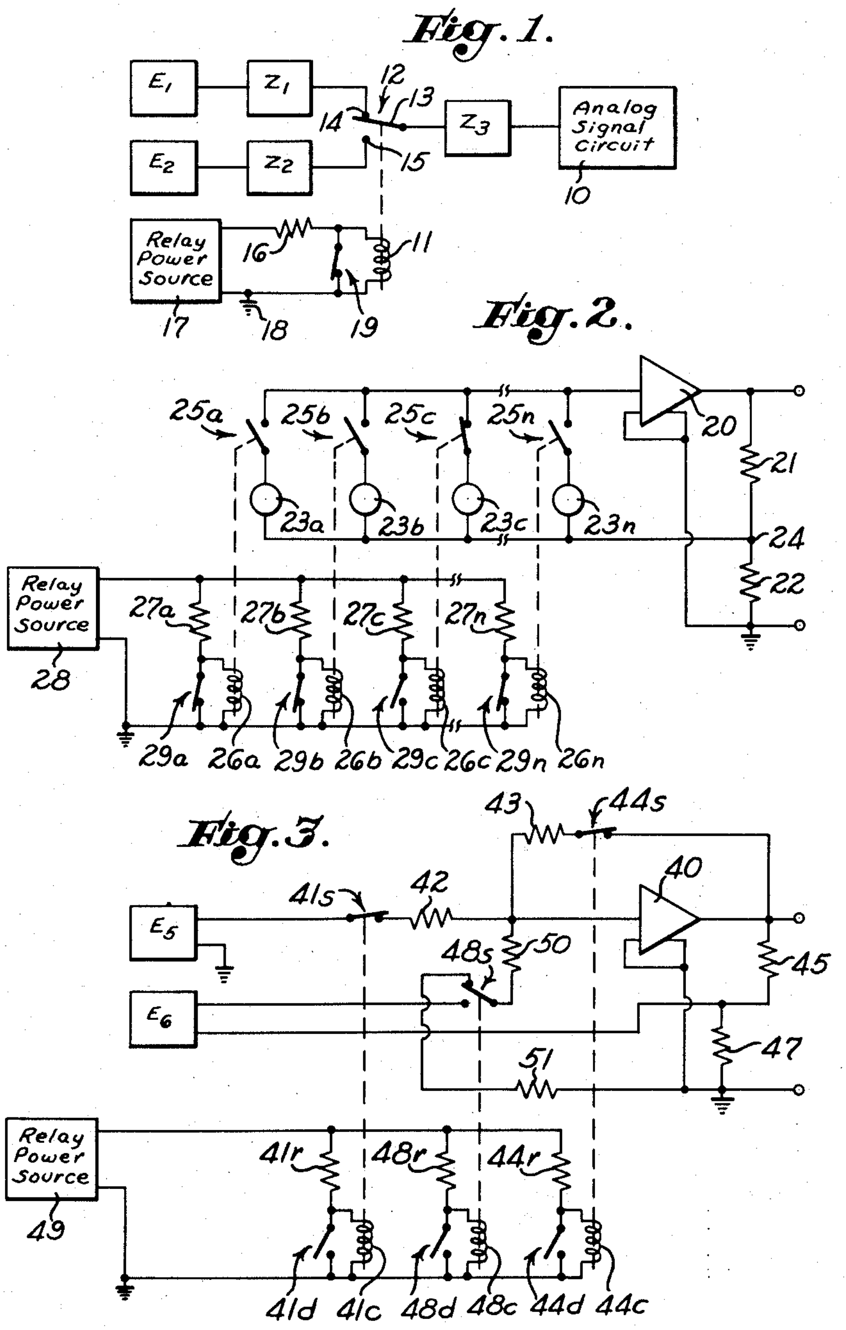
Fig. 1 is a schematic diagram illustrating the use of the circuit of the invention in selecting one of two signal sources.
Fig. 2 is a schematic diagram illustrating the use of the circuit of the invention in switching a plurality of signal sources.
Fig. 3 is a schematic diagram illustrating the use of the circuit of the invention in changing the mode of operation of an amplifier.

The circuit of Fig. 1 provides for connection of either of two signal sources $E_1$, $E_2$ to an analog signal circuit 10. The analog signal circuit may be an amplifier, a computer, an analog-to-digital converter, or other suitable unit. The signal $E_1$ is to be connected through a relatively high impedance $Z_1$ and another impedance $Z_3$, while the signal $E_2$ is to be connected through a relatively low impedance $Z_2$ and the impedance $Z_3$. The signal $E_2$ may be zero voltage, i.e., at circuit ground in certain applications of the invention. The signal switching is accomplished by a relay having a coil 11 and a contact set 12 with the moving arm 13 of the set connected to the impedance $Z_3$, one fixed contact 14 connected to the impedance $Z_1$ and the other fixed contact 15 connected to the impedance $Z_2$. A current limiting resistor 16 is connected in series with the coil 11 across a relay power source 17 which ordinarily would be a battery or other D.C. voltage source. The end of the coil 11 which is directly connected to the power source, is also connected to circuit ground as indicated at 18, and an off-on switch 19 is connected across the coil 11. The switch 19 may be manually operated, remotely operated or automatically operated in any conventional manner and may be another relay, a snap switch, a transistor switch, or the like.

In the operation of the switching circuit of Fig. 1, the contact set 12 is switched to the position shown when the coil 11 is unenergized. The coil 11 is de-energized by closing the switch 19 which connects both ends of the coil to ground and shunts the relay power source to ground through the resistor 16. When the switch 19 is open, the coil 11 is energized by the relay power source and the contact set is switched to a condition opposite that shown in the drawing. Hence, when there is current in the coil 11, a low impedance circuit is connected to the analog signal circuit while the high impedance circuit is connected only when the coil is grounded. Electrical noise and ripple from the power source 17 is transferred to the analog signal circuit 10 through the capacitance between the coil 11 and the contact set 12 when the coil is connected to the power source. Therefore, in the switching circuit of the invention both ends of the coil 11 are directly connected to ground when the contact set is connecting a high impedance source to the analog signal circuit, thereby substantially eliminating coupling between the relay power source and the analog signal circuit. When the coil 11 is energized from the relay power source, the analog signal circuit is connected to the low impedance source and the effect of the coil-contact capacitance is relatively small. This mode of connecting and operating the relay substantially eliminates the adverse effects due to the construction of the relay, especially in connection with mercury contact types of relays.

Fig. 2 shows a circuit for connecting one or more of a plurality of floating signal sources as inputs to an amplifier which is operated as a potentiometric type feedback amplifier. An amplifier 20 is connected as a potentiometric feedback amplifier with resistances 21, 22 connected in series across the amplifier output and ground. Input signal sources **23*a*–23*n* are floating with respect to circuit ground and each is connected in series between junction 24 of the resistors 21, 22 and the amplifier input by a corresponding relay contact set 25*a*–25*n*. Each contact set is actuated by a corresponding relay coil 26*a*–26*n*. Each coil is connected in series with a resistor 27*a*–27*n* across a relay power source 28 and an off-on switch 29*a*–29*n*** is connected in parallel with each coil respectively. The common junction point of the relay coils and the relay power source is connected to circuit ground as in the circuit of Fig. 1.

In the circuit of Fig. 2, the signal source **23*c* is connected to the input of the amplifier 20 by the closed contact set 25*c* and the energized coil 26*c*. The greater adverse effects due to power supply noise injection will normally occur at the plurality of open contacts rather than at the closed set 25*c*. Therefore, the coils associated with each of the open contact sets are shunted to ground by the closed switches 29 while the contact set 25*c* is closed by opening the switch 29*c* and energizing the coil 26*c***. Therefore it is seen that, as in the circuit of Fig. 1, the grounded or dead relay coils are used for optimum suppression of noise current injection from the relay drive circuitry.

In the circuit of Fig. 3, an amplifier 40 is connected so as to operate as an operational type feedback amplifier with a signal source $E_5$ or as a potentiometric type feedback amplifier with a signal source $E_6$. One terminal of the source $E_5$ is connected to the amplifier input through a contact set **41*s* and a resistance 42, with the other terminal of the source connected to circuit ground. A resistance 43 and a contact set 44*s* are connected in series across the input and output of the amplifier 40. Resistances 45 and 47 are connected in series between the amplifier output and circuit ground. One terminal of the source $E_6$ is connected to the amplifier input through a contact set 48*s* and a resistance 50 and the other terminal is connected to the junction of the resistances 45, 47. The contact set 48 is of the single-pole, double-throw type with the arm connected to the resistance 50, one fixed contact to the source $E_6$ and the other fixed contact to circuit ground through a resistance 51** of relatively low impedance.

The contact sets **41*s*, 44*s* and 48*s* are actuated by relay coils 41*c*, 44*c* and 48*c*, respectively. Each coil is shunted by an off-on switch 41*d*, 44*d*, 48*d*, respectively, and each is connected in series with a resistance 41*r*, 44*r*, 48*r*, respectively, across a relay power source 49** with the junction of the relay coils and the power source connected to circuit ground.

In the operational configuration, the contact sets **41*s* and 44*s* are closed and the set 48*s* is connecting the summing node of the amplifier to circuit ground through the resistances 50 and 51. These conditions are achieved by having each of the relay coils energized as shown in the figure of the drawing. In the potentiometric configuration, sets 41*s* and 44*s* are open, while set 48*s* connects the source $E_6$ to the summing node. This condition is achieved by shunting each of the relay coils by its associated switch to de-energize the coil and connect both ends thereof to circuit ground. With the amplifier in the operational mode, the amplifier input has a low impedance to ground because the signal source $E_5$ has a low impedance to ground. Hence, spurious noise from the coil 41*c* of the set 41*s* will have a relatively small influence on the amplifier output. Similarly, the contacts of the set 44*s* are tied to the low impedance output of the amplifier 40, and the coil 44*c* does not inject current through the resistance 43. In the operational mode, the arm of the set 48*s* is connected to circuit ground through the small resistance 51** and, therefore, injected noise currents are drained to ground. For these reasons, each of the relays is energized to provide the operational configuration.

In contrast, when in the potentiometric configuration, the amplifier input is at a high impedance to circuit ground and all of the relay coils are shunted to circuit ground to minimize undesired noise transference through the coil-contact capacitance and leakage resistance of the individual relays.

Thus it is seen that the objects of the invention are achieved while utilizing conventional relays and without requiring additional components by connecting and operating the relay coils and contacts in a particular manner. Although exemplary embodiments of the invention have been disclosed and discussed, it will be understood that other applications and circuit arrangements are possible and that the embodiments disclosed may be subjected to various changes, modifications and substitutions without necessarily departing from the spirit of the invention.

I claim as my invention:

1. In a relay switching circuit for low level analog signal voltages, the combination of: a relay having a coil and a contact set comprising a moving arm and first and second fixed contacts; a first relatively high impedance for connecting a first signal to said first contact; a second relatively low impedance for connecting a second signal to said second contact; a third impedance for connecting said arm to an analog signal circuit, said arm being switched to said first contact when said coil is unenergized; an off-on switch connected in parallel with said coil; a relay power source having one terminal connected to circuit ground and to one terminal of said coil; and a current limiting resistance connected between the other terminal of said source and the other terminal of said coil with said switch in the on condition connecting both terminals of said coil to circuit ground and in the off condition energizing said coil to connect the second signal to the analog signal circuit.

2. In a circuit for switching signal voltages to an amplifier input or the like, the combination of: a plurality of relays, each of said relays having a coil and an off-on contact set, each of said contact sets being adapted to connect a signal voltage to the amplifier input with a contact set in the on condition when the corresponding coil is energized; a plurality of off-on switches, with a switch connected across each relay coil respectively; a plurality of resistances, with a resistance connected in series with each relay coil respectively to form a plurality of coil drive circuits, each drive circuit having a coil terminal and a resistance terminal; and a relay drive power source connected across all of said coil drive circuits with each coil terminal connected to circuit ground such that both ends of a coil are connected to circuit ground when the corresponding switch is closed and the contact set in the off condition.

3. In a circuit for switching signal voltages, the combination of: an amplifier; a pair of output resistances connected in series between the amplifier output and circuit ground; a plurality of relays, each of said relays having a coil and an off-on contact set; a plurality of signal sources; means for connecting each of said contact sets in series with a corresponding signal source between the junction of said output resistances and the amplifier input, each of said contact sets being in the on condition when the corresponding coil is energized; a plurality of off-on switches with a switch connected across each relay coil respectively; a plurality of coil resistances, with a coil resistance connected in series with each relay coil respectively to form a plurality of coil drive circuits, each drive circuit having a coil terminal and a resistance terminal; and a relay drive power source connected across all of said coil drive circuits with each coil terminal connected to circuit ground such that both ends of the coil are connected to circuit ground when the corresponding switch is closed and the contact set is in the off condition.

4. In a circuit for switching voltages in a feedback amplifier, the combination of: first and second relays, each of said relays having a coil and an off-on contact set with each contact set in the on condition when the corresponding coil is energized; a third relay having a coil and a double-pole contact set with the contact set in the reverse condition when the corresponding coil is energized and in the forward condition when the coil is unenergized; an amplifier; a first resistance connected in series with said first contact set between said amplifier input and a first signal source; a second resistance connected in series with said second contact set across said amplifier input and output; third and fourth resistances connected in series between said amplifier output and circuit ground; a fifth resistance connected in series with said third contact set and a second signal source between said amplifier input and the junction of said third and fourth resistances when said third contact set is in the forward condition; a sixth resistance connected in series with said third contact set between said fifth resistance and circuit ground when said third contact set is in the reverse condition, with one terminal of said first, second and fifth resistances connected to a common point; a plurality of off-on switches, with a switch connected across each relay coil respectively; a plurality of coil resistances, with a resistance connected in series with each relay coil respectively to form a plurality of coil drive circuits, each drive circuit having a coil terminal and a resistance terminal; and a relay drive power source connected across all of said coil drive circuits with each coil terminal connected to circuit ground such that both ends of a coil are connected to circuit ground when the coresponding switch is closed with the amplifier operating as an operational feedback type when all coils are energized and as a potentiometric feedback type when all coils are shunted to circuit ground.

5. In a switching circuit for alternately connecting and disconnecting an input voltage to and from an analog signal circuit, the combination of: contact means for connecting and disconnecting the input voltage; an inductive coil for operating said contact means; a direct voltage supply source having a first grounded terminal and a second terminal at a voltage different from ground; a current limiting resistor connected between one terminal of said coil and said second power supply terminal with the other terminal of said coil grounded; and a shunting switch connected in parallel with said coil so that said coil is energized when said shunting switch is open and not energized when said shunting switch is closed.

6. In a relay switching circuit, the combination of: a relay having a coil and a contact set; an off-on switch connected in parallel with said coil; a relay power source having one terminal connected to circuit ground and to one terminal of said coil; and a current limiting resistance connected between the other terminal of said source and the other terminal of said coil with said switch in the on condition connecting both terminals of said coil to circuit ground and in the off condition energizing said coil to actuate said contact set.

References Cited in the file of this patent

UNITED STATES PATENTS

| | | |
|---|---|---|
| 2,672,529 | Villard | Mar. 16, 1954 |
| 2,757,283 | Ingerson et al. | July 31, 1956 |
| 2,764,714 | Heyduck | Sept. 25, 1956 |
| 2.790,114 | Perkins | Apr. 23, 1957 |